(12) United States Patent
Querejeta Andueza et al.

(10) Patent No.: US 10,835,078 B2
(45) Date of Patent: Nov. 17, 2020

(54) GAS TAP FOR A GAS BURNER, AND A GAS COOKING APPLIANCE INCORPORATING SAID GAS TAP

(71) Applicant: Copreci, S. Coop., Aretxabaleta (ES)

(72) Inventors: Felix Querejeta Andueza, Hendaye (FR); Jose Ignacio Mugica Odriozola, Bergara (ES); Iñigo Albizuri Landazabal, Muxika (ES); Isabel Alava Perez, Miñano (ES)

(73) Assignee: COPRECI, S. COOP., Aretxabaleta (ES)

( * ) Notice: Subject to any disclaimer, the term of this patent is extended or adjusted under 35 U.S.C. 154(b) by 145 days.

(21) Appl. No.: 16/294,136

(22) Filed: Mar. 6, 2019

(65) Prior Publication Data

US 2019/0274477 A1  Sep. 12, 2019

(30) Foreign Application Priority Data

Mar. 7, 2018 (EP) ..................................... 18382139

(51) Int. Cl.
*A47J 37/07* (2006.01)
*F23N 1/00* (2006.01)
*F16K 5/02* (2006.01)
*F16K 5/08* (2006.01)

(52) U.S. Cl.
CPC .......... *A47J 37/0713* (2013.01); *F23N 1/007* (2013.01); *F16K 5/02* (2013.01); *F16K 5/08* (2013.01); *F23N 2235/18* (2020.01); *F23N 2235/24* (2020.01); *F23N 2237/02* (2020.01); *F23N 2241/08* (2020.01)

(58) Field of Classification Search
CPC ........ F23N 1/007; A47J 37/0713; F16K 5/10; F16K 5/002; F16K 2235/24; F16K 5/08; F16K 5/02; F16K 5/13–16; F16K 11/08–0836; F16K 27/062
USPC ................................. 126/25 R; 137/876, 672
See application file for complete search history.

(56) References Cited

U.S. PATENT DOCUMENTS 5,575,638 A * 11/1996 Witham .................. F24C 3/126
431/73
7,096,887 B2 * 8/2006 Tupa ..................... F16K 11/083
137/625.47

(Continued)

FOREIGN PATENT DOCUMENTS

CN      205780987 U     12/2016
CN      206830877 U      1/2018

*Primary Examiner* — Edelmira Bosques
*Assistant Examiner* — Nikhil P Mashruwala
(74) *Attorney, Agent, or Firm* — Edell, Shapiro & Finnan, LLC

(57) ABSTRACT

A gas tap for a gas burner that includes a gas inlet conduit for the entry of gas at a nominal pressure, at least one outlet conduit suitable for conducting gas to the burner through an outlet hole, and a rotating regulating element for regulating the incoming gas flow from the inlet conduit to the outlet conduit. The outlet conduit conducting a variable flow rate gas flow to the outlet hole when the regulating element rotates along an angular path. The gas tap also includes at least one constant flow outlet conduit for conducting a minimum constant flow rate gas flow (Qc) at nominal pressure (Pn) to the burner through a constant flow outlet hole when the regulating element rotates along the angular path.

20 Claims, 8 Drawing Sheets

(56) References Cited

U.S. PATENT DOCUMENTS

| | | | | |
|---|---|---|---|---|
| 8,001,957 B2* | 8/2011 | Clauss | .................... | F23N 1/005 |
| | | | | 126/42 |
| 9,140,457 B2* | 9/2015 | Deng | ........................ | F24C 1/02 |
| 9,488,282 B2* | 11/2016 | Li | .......................... | F16K 11/14 |
| 9,752,779 B2* | 9/2017 | Deng | ...................... | F23N 1/002 |
| 9,803,773 B2* | 10/2017 | Zhang | ................. | F16K 11/0833 |
| 9,903,587 B2* | 2/2018 | Albizuri Landazabal | .................... | |
| | | | | F16K 5/0207 |
| 2010/0032038 A1* | 2/2010 | Xie | .................... | F16K 11/0836 |
| | | | | 137/625.46 |
| 2017/0367532 A1 | 12/2017 | Alden et al. | | |
| 2019/0093885 A1* | 3/2019 | Kalisiak | .............. | A47J 37/0786 |
| 2020/0103108 A1* | 4/2020 | Bratti | ..................... | F23N 1/005 |

\* cited by examiner

GAS TAP FOR A GAS BURNER, AND A GAS COOKING APPLIANCE INCORPORATING SAID GAS TAP

CROSS-REFERENCE TO RELATED APPLICATIONS

This application relates to and claims the benefit and priority to European Application NO. EP18382139.6, filed Mar. 7, 2018.

TECHNICAL FIELD

The present invention relates to gas taps for gas burners and to gas cooking appliances incorporating said gas taps.

BACKGROUND

Gas taps for a gas burner for a gas cooking appliance such as a barbecue are known, where the burners are elongated and have many gas outlet ports, where it is necessary for the gas to be injected in said gas burners from the gas taps, at a given velocity and pressure so that the flame in all the outlet ports of the burners can be produced and have sufficient quality. Gas taps comprise a regulating element with a plurality of connection openings for regulating gas flow in a gas outlet conduit of the gas tap. The gas flow in the outlet conduit has a gas flow rate that is variable between a closed OFF position without gas flow, and a regulation of the gas flow ranging between a minimum flow rate at a low pressure with respect to the nominal supply pressure of the gas, and a maximum flow rate at the nominal supply pressure of the gas.

Elongated gas burner tubes with a venturi for use in gas barbecues are also known. U.S. Publication No. 2017/0367532A1 describes a burner assembly comprising an elongated burner tube with an upper surface comprising a plurality of gas outlet ports, a gas tap which is arranged at an open end of the gas burner for injecting a gas flow, said gas mixing with the air coming from air absorption windows arranged on the sides of the open inlet of the gas burner, and a venturi arranged at the open inlet of the gas burner, to direct the turbulent mixture of air and gas from the inlet of the gas burner, and turn it into gentle and consistent mixed flow of air and gas, towards the outlet ports of the gas burner.

Gas taps for a gas burner are known, where said gas taps comprise a valve body comprising a gas inlet conduit for the entry of gas at a nominal supply pressure, a gas outlet conduit suitable for conducting gas to the burner through an outlet hole, and a rotating regulating element housed in said valve body, comprising a plurality of connection openings for regulating the incoming gas flow from the inlet conduit to the outlet conduit by varying an outlet gas flow rate in said outlet conduit according to the angular position of the regulating element on an angular path, the outlet conduit conducting a variable flow rate gas flow to the outlet hole when the regulating element rotates along the angular path.

SUMMARY

According to one embodiment a gas tap is provided that comprises a valve body having a gas inlet conduit for the entry of gas at a nominal supply pressure, at least one gas outlet conduit suitable for conducting gas to the burner through an outlet hole, and a rotating regulating element housed in said valve body, comprising a plurality of connection openings for regulating the incoming gas flow from the inlet conduit to the outlet conduit by varying an outlet gas flow rate in said outlet conduit according to the angular position of the regulating element along an angular path, the outlet conduit conducting a variable flow rate gas flow to the outlet hole when the regulating element rotates along the angular path.

The gas tap further comprises at least one constant gas flow outlet conduit for conducting a minimum constant flow rate gas flow at the nominal supply pressure to the gas burner through a constant flow outlet hole when the regulating element rotates along the angular path.

The constant flow outlet conduit conducts a constant flow rate gas flow along the entire regulating angular path of the regulating element at the nominal supply pressure of the gas in the inlet conduit of the gas tap. Therefore, even though the total outlet gas flow rate in the gas tap is variable, given that the gas flow in the outlet conduit has a variable flow rate, the gas outlet speed in the outlet holes is increased, and the proportion of air in the mixture with gas at the outlet of the outlet holes and towards the burner is considerably increased. The calorific value ratio in the gas burner can thereby be increased, where calorific values that are lower compared to taps from the prior art are achieved particularly in the gas tap minimum gas flow rate position. In that sense, in the example of gas barbecues this ratio can go from 1 to 2, between the minimum and maximum calorific values, to a ratio of 1 to 5, for example. This invention does all this with good flame quality at the outlet of the ports of the gas burner.

These and other advantages and features of the invention will become apparent in view of the drawings and detailed description of the invention.

DETAILED DESCRIPTION

Figure 1A:
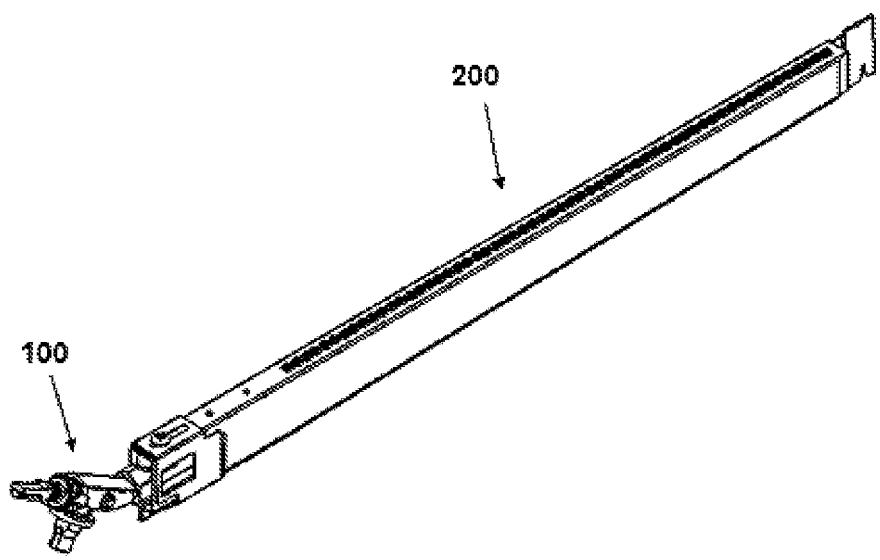
FIG. 1A shows a perspective view of a gas tap coupled to a gas burner according to one embodiment.
Figure 1B:
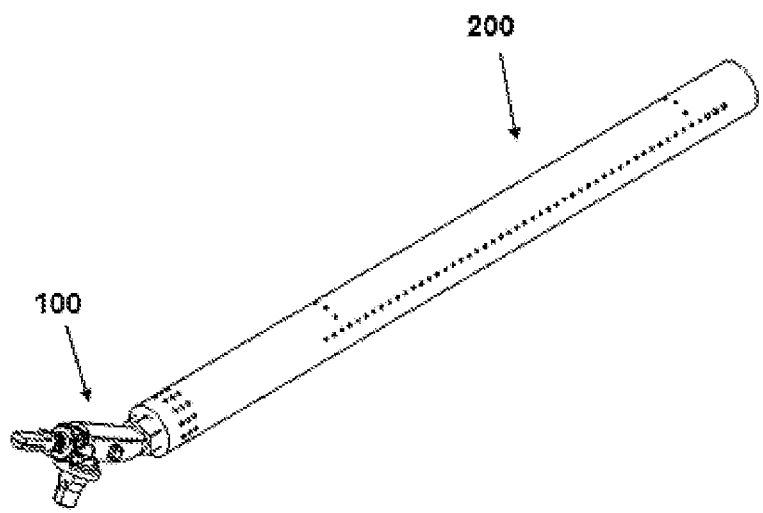
FIG. 1B shows a perspective view of the gas tap of FIG. 1A, coupled to a second embodiment of the gas burner.
Figure 11A:
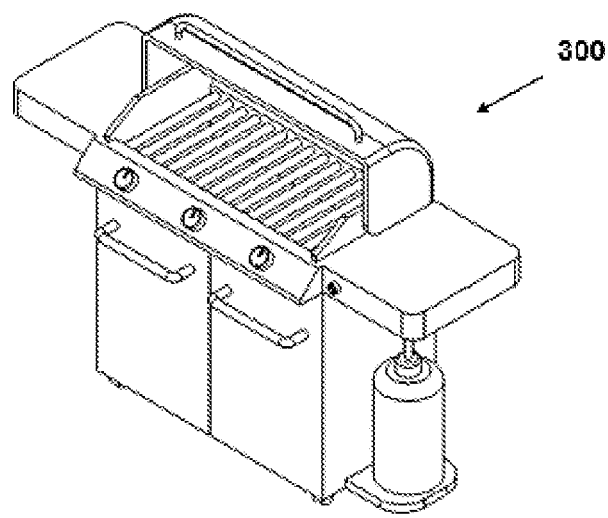
FIG. 11A shows a perspective view of a gas cooking appliance according to one embodiment.
Figure 11B:
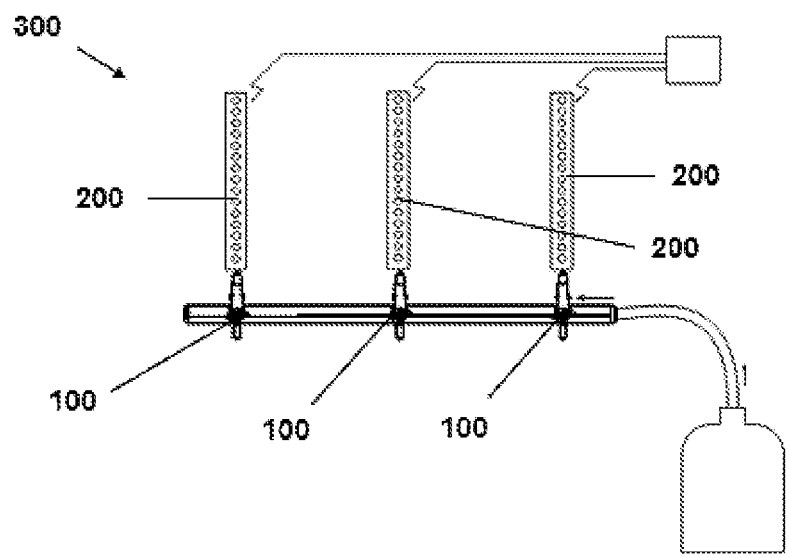
FIG. 11B shows a partial schematic view of the gas circuit of the gas cooking appliance of FIG. 11A.

FIGS. 1A and 1B show a perspective view of an embodiment of a gas tap 100 according to one embodiment, coupled to two different embodiments of a gas burner 200, one gas burner 200 with a substantially rectangular cross section in FIG. 1A, in which the longest sides of said cross section are arranged vertically, and one gas burner 200 with a substantially circular cross section in FIG. 1B. FIG. 11A shows a perspective view of an embodiment of a gas cooking appliance 300. According to one embodiment the gas cooking appliance is a gas barbecue comprising three gas taps 100 coupled respectively to three gas burners 200. FIG. 11B shows a partial schematic view of the gas circuit of the gas cooking appliance 300 of FIG. 11A.

Figure 2A:
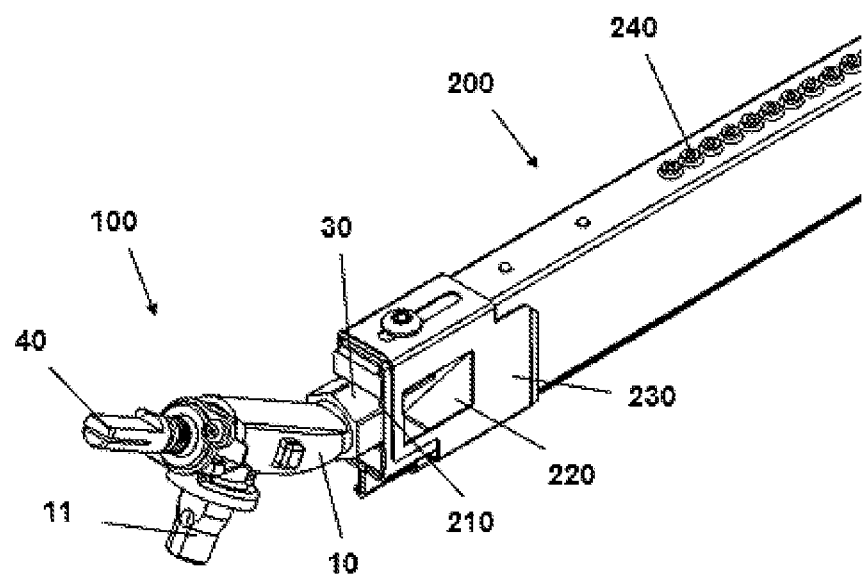
FIG. 2A shows a partial detailed perspective view of the gas tap coupled to a gas burner of FIG. 1A.
Figure 2B:
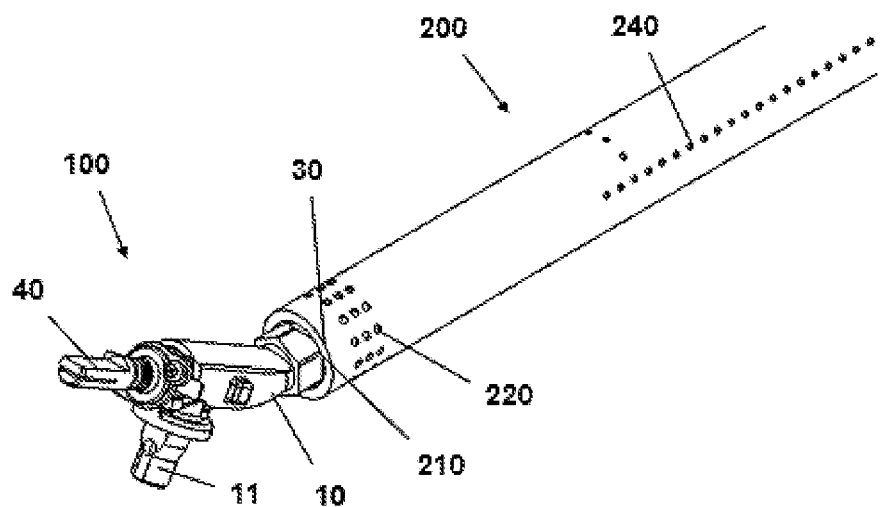
FIG. 2B shows a partial detailed perspective view of the gas tap coupled to a gas burner of FIG. 1B.

These gas burners 200 may have a general elongated tube shape and comprise along the length thereof a plurality of gas outlet ports 240 on the upper surface thereof, as shown in FIGS. 2A and 2B. The gas tap 100 is arranged at an open end of the gas burner 200 in an inlet mouth 210 for injecting a gas flow. The injected gas is mixed with the outside air coming from air absorption windows 220 which are arranged, in the shown embodiments, on each of the sides of the gas burner 200 of FIG. 2A, and around the entire perimeter in the gas burner 200 of FIG. 2B.

According to one embodiment the gas tap 100 for a gas burner 200 comprises a valve body 10, said body 10 comprising a gas inlet conduit 11 for the entry of gas supplied from an outside source at a nominal supply pressure Pn. In this embodiment of the gas tap 100, the body 10 also comprises a gas outlet which is suitable for conducting gas to the inside of the burner 200, and a rotating regulating element 20 housed in said valve body 10 which has a frustoconical shape in this embodiment. Said regulating element 20 comprises a plurality of connection openings (not depicted) for regulating the incoming gas flow from the inlet conduit 11 to the gas outlet, by varying an outlet gas flow rate Q at said gas outlet.

Said connection openings in the regulating element 20 can be, for example, a maximum gas flow hole that goes through the wall of the regulating element 20 to an internal axial hole that is closed at an upper end and open at a lower end. Said maximum hole is in fluid communication with a maximum perimeter groove partially running along the perimeter of the regulating element 20, the section thereof progressively decreasing from the maximum hole, without going through the wall of said regulating element 20. The maximum hole/perimeter groove assembly allows regulating gas flow from a maximum flow to zero flow, for example, on an angular path of the regulating element 20, and it is in fluid communication with an internal outlet conduit for the maximum gas flow in the body 10 of the gas tap 100, through the axial hole of the regulating element 20.

Another minimum perimeter groove can be arranged parallel to the maximum gas flow perimeter groove that does not have any section restrictions, such that the nominal supply pressure Pn of the gas is maintained practically constant. In this embodiment of the gas tap 100, this minimum perimeter groove is placed in an angular manner on the surface along the perimeter of the regulating element 20 on an angular path A, starting at the angular position of the maximum hole, and it is longer than the angular path of the maximum perimeter groove, in fluid communication with the inlet conduit 11 and with an internal outlet conduit for the minimum gas flow in the body 10 of the gas tap 100.

Therefore, according to the angular position of the regulating element 20 on angular path A, the flow rate Q of the gas flow exiting the gas tap 100 is regulated at the gas outlet. To provide an outlet for the regulated gas flow, the gas tap 100 comprises an injector 30 in this embodiment which is arranged fixed at a gas outlet end of the gas tap 100.

Figure 3:
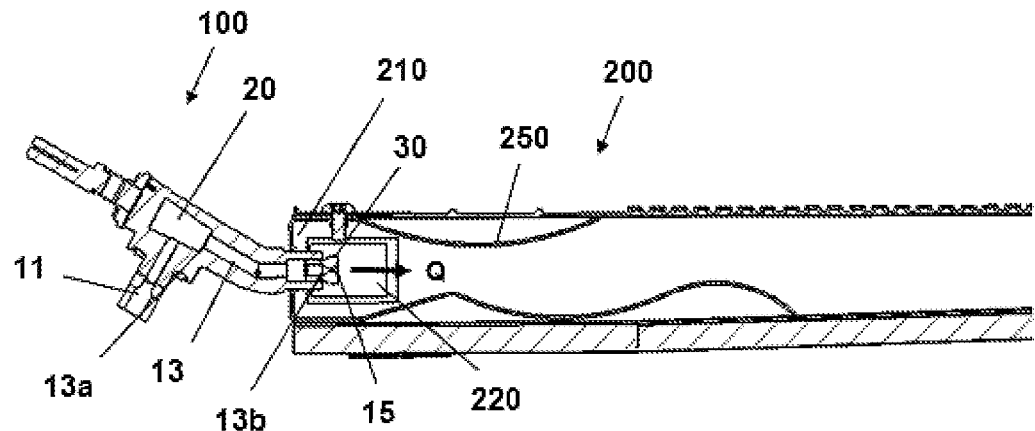
FIG. 3 shows a partial longitudinal section view of a gas tap coupled to a gas burner of the prior art.

FIG. 3 shows a partial longitudinal section view of a gas tap 100 coupled to a gas burner 200 of the prior art. In the prior art, it is common to arrange a venturi 250 at the inlet and coupled to the gas burner 200. The gas tap 100 comprises a gas outlet at the end of which there is arranged an injector 30 with a gas outlet hole 15, and on the inside of which there is arranged a gas outlet conduit 13. Said outlet conduit 13 is in fluid communication at a first end with a connection opening of the regulating element 20 of the gas tap 100, for example a lower opening in the regulating element 20, and at a second end with the injector 30, providing an outlet for the gas flow through the outlet hole 15. When the regulating element 20 rotates along a given angular path, the gas outlet conduit 13 conducts a variable flow rate gas flow to the gas outlet hole 15. This single outlet hole 15 is not able, particularly in positions of the regulating element 20 close to the minimum gas flow in which the gas pressure is quite a bit lower than the nominal supply pressure Pn, to provide sufficient gas outlet speed and, accordingly, to entrain an amount of air from two air absorption windows 220 arranged on the sides of the gas burner 200 in the embodiment that is shown.

Figure 4:
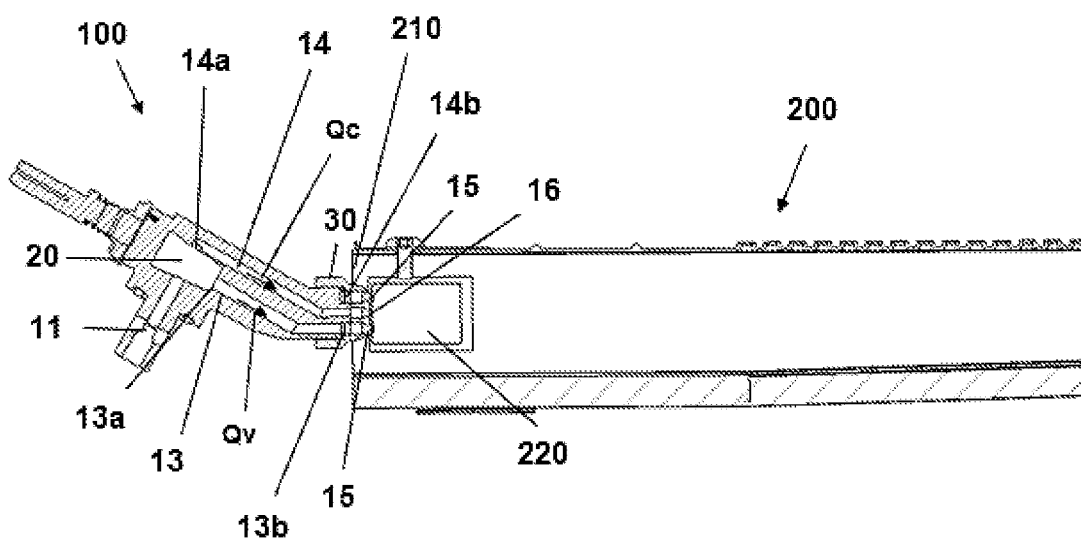
FIG. 4 shows a partial longitudinal section view of the gas tap coupled to a gas burner of FIG. 1A.
Figure 5:
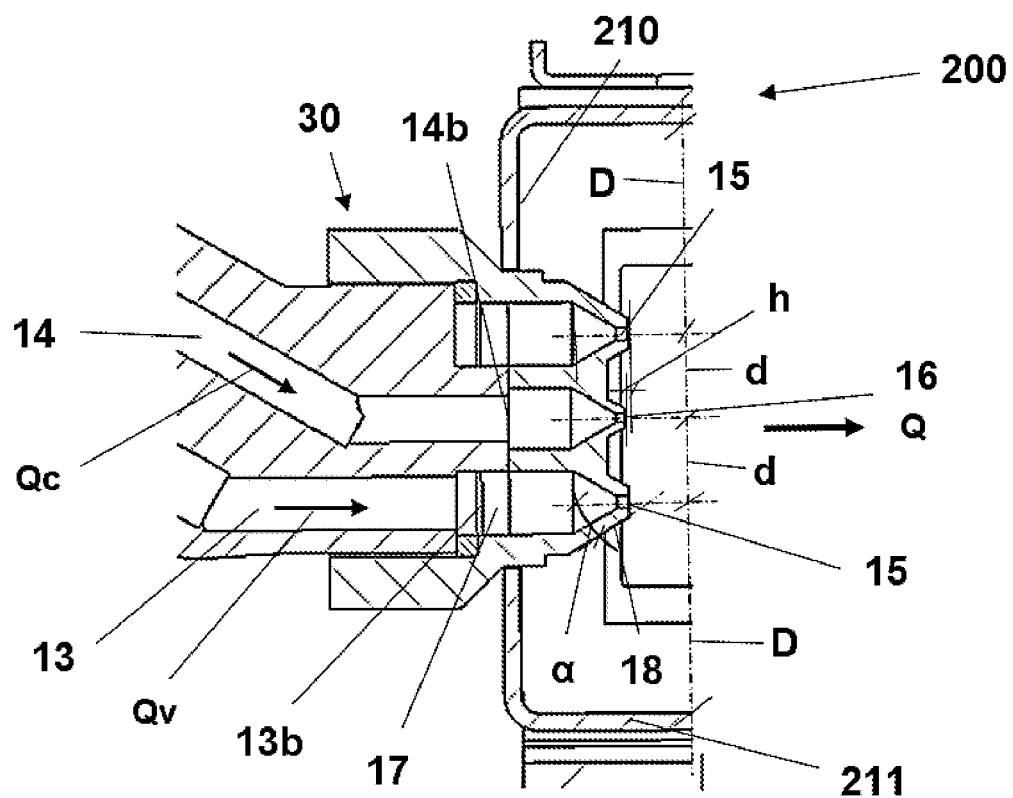
FIG. 5 shows a partial detailed longitudinal section view of the end of the gas tap coupled to a gas burner of FIG. 4.
Figure 6:
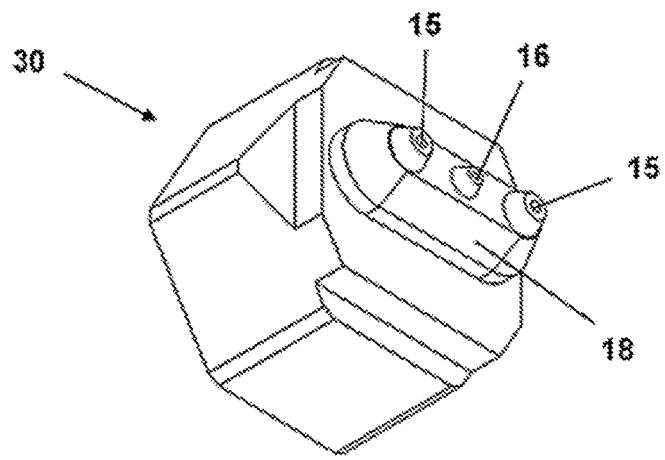
FIG. 6 shows a perspective view of an embodiment of the injector of the gas tap of FIG. 1A.

To solve the mentioned problem, and as shown in FIGS. 4 and 5 in a partial longitudinal section view of an embodiment of the gas tap 100 coupled to a gas burner 200, and in a partial detailed longitudinal section view of the end of the gas tap 100 coupled to the gas burner 200 of FIG. 4, the injector 30 comprises, as shown in FIG. 6, two outlet holes 15 and a constant flow outlet hole 16, with the constant flow outlet hole 16 being arranged between the two outlet holes 15. In this embodiment of the gas tap 100, the outlet holes 15 and 16 are arranged aligned with respect to a longitudinal vertical plane of the gas burner 200, but said outlet holes 15 and 16 can likewise be arranged on a plane orthogonal to the longitudinal vertical plane of the gas burner 100, or on another plane with another angular inclination. In this embodiment, the axes of the outlet holes 15 and 16 are arranged at a distanced. There is a distance D between each axis of the outlet holes 15 and the closest wall 211 of the laterally arranged respective air absorption windows 220. Distance d is smaller than distance D, such that enough space is created between the side outlet holes 15 and the air absorption windows 220 for the outside air to be absorbed with no trouble. Furthermore, and to achieve the same effect, the outlet holes 15 and 16 are arranged before the air absorption window 220 in the gas flow direction, with the gas outlet of the gas tap 100 preferably being centered in the inlet mouth 210 of the gas burner 200.

The gas outlet of this gas tap 100 comprises, in this embodiment, an outlet conduit 13 which is in fluid communication with the connection opening of the internal axial hole of the regulating element 20 at a first end 13a, and with the injector 30 at a second end 13b, providing an outlet for the gas flow to the burner 200 through the gas outlet holes 15. To provide an outlet for the gas towards the two outlet holes 15, the injector 30 comprises a chamber 17, which is in fluid communication with the two outlet holes 15 and connected with the second end 13b of the outlet conduit 13, thereby placing said outlet conduit 13 in fluid communication with the two outlet holes 15.

Figure 10:
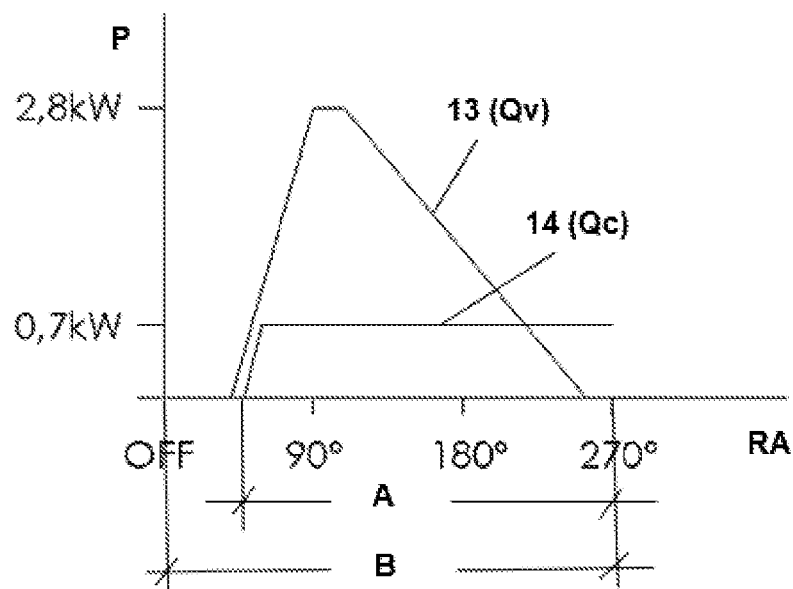
FIG. 10 shows a graph relating the calorific value and angular path of the regulating element of the gas tap of FIG. 4.

The gas tap 100 comprises an actuating shaft 40 that is coupled to the regulating element 20. Attached to an end of the actuating shaft is a control knob. Therefore, the regulating element 20 can rotate on an angular path B as shown in FIG. 10. In this embodiment of the gas tap 100, this angular path B of the actuating shaft comprises positions ranging from an initial angular OFF position without gas flow to a final angular position at 270° with minimum gas flow. Angular path B is greater than angular path A for regulating the gas flow of the gas tap 100 of the regulating element 20 since, in this embodiment of the gas tap 100, gas flow regulation starts at approximately an angular position of 30°, with maximum gas flow being reached at approximately an angular position of 90°. When the user actuates the control knob, turning it to regulate a given gas flow, the outlet conduit 13 conducts a variable flow rate gas flow Qv to the two outlet holes 15 on the angular path A of the regulating element 20.

In this embodiment, the gas outlet of the gas tap 100 comprises a constant flow outlet conduit 14 which is in fluid communication at a first end 14a with a connection opening of the regulating element 20 which, in this embodiment and as described above, can be a minimum perimeter groove running along the outer perimeter of the regulating element 20 on the angular path A, and having no restrictions which reduce the nominal supply pressure Pn. At a second end 14b, it is in fluid communication with the injector 30, said constant flow outlet conduit 14 being connected with the constant flow outlet hole 16 through the injector 30, providing an outlet for the gas flow to the burner 200. The constant flow outlet conduit 14 thereby conducts a minimum constant flow rate gas flow Qc at the nominal supply pressure Pn to the constant flow outlet hole 16, when the regulating element 20 rotates along the angular path A.

Figure 9:
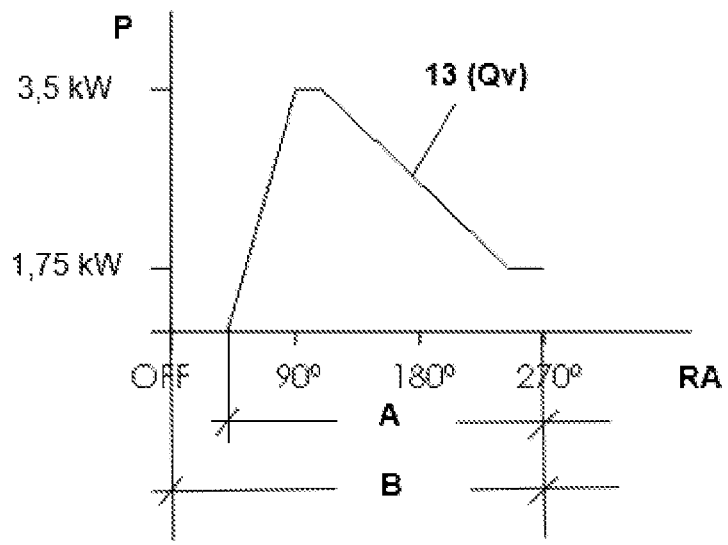
FIG. 9 shows a graph relating the calorific value and angular path of the regulating element of the gas tap of the prior art of FIG. 3.

This means that, even though throughout the entire angular path A of the regulating element 20 for regulating the gas flow, the total flow rate Q of the gas exiting the gas tap 100 is variable due to the gas flow in the first conduit, a minimum constant flow rate gas flow Qc is produced along the entire angular path A, which accordingly leads to the gas outlet speed increasing in the constant flow outlet hole 16, just as it also increased in the two outlet holes 15 by arranging two instead of one and reducing the outlet diameter of said outlet holes 15. Therefore, together with the gas outlet speed, the proportion of air in the mixture with the gas at the outlet of the outlet holes 15 and 16 and towards the burner 200 is increased. The calorific value ratio in the gas burner 200 can thereby be increased, since lower calorific values are obtained in the minimum gas flow rate position of the gas tap 100, for example in the order of 0.7 Kw, compared to, for example, in the order of 1.75 Kw in gas taps from the prior art. In that sense it is possible to go from a ratio of 1 to 2, between the minimum and maximum calorific values, for example 1.75 Kw at the minimum to 3.5 Kw at the maximum, as shown in FIG. 3, to a ratio of, for example, 1 to 5, for example 0.7 Kw at the minimum to 3.5 Kw at the maximum, as shown in FIGS. 9 and 10.

The increased ratio is accomplished with good flame quality at the outlet of the ports of the gas burner 200. In one embodiment, in the minimum gas flow position the gas outlet speed at outlet ports 240 of the burner 200 is improved from about 0.3 meters/second in a gas tap 100 coupled to a gas burner 200 of the prior art depicted in FIG. 3, which does not assure proper ignition of all the outlet ports 240, to values of about 1.1 meters/second in a gas tap 100 coupled to a gas burner 200 as depicted in FIG. 4. The proportion of primary air in the mixture with the gas injected in the outlet ports 240 of the burner 200 is improved from about 35% in a gas tap 100 coupled to a gas burner 200 of the prior art depicted in FIG. 3, which does not assure good flame quality in all the outlet ports 240, to values of about 140% in a gas tap 100 coupled to a gas burner 200 of the invention depicted in FIG. 4. This is accomplished without using a venturi coupled to the gas burner 200.

In the same manner, in the maximum gas flow position the gas outlet speed at outlet ports 240 of the burner 200 is improved from about 2.2 meters/second to values of about 2.5 meters/second. The proportion of primary air in the mixture with the gas injected in the outlet ports 240 of the burner 200 is improved from about 58% to values of about 66%. This is accomplished without using a venturi coupled to the gas burner 200. Improved values can thereby be seen in both positions, but especially in the minimum gas flow position, obtaining a gentle and consistent mixed flow of gas and air at all the outlet ports 240 of the gas burner 200, and costs are furthermore reduced because the venturi is not required.

In the embodiment of the gas tap 100 that is shown, the variable gas flow rate Qv in the outlet conduit 13 varies during the angular path A of the regulating element 20 between zero and a maximum flow rate Qmax corresponding to a calorific value of 2.8 Kw. On the other hand, the flow rate Qc in the constant flow outlet conduit 14 is constant on the entire angular path A, corresponding to a minimum flow rate Qcmin of 0.7 Kw, so the maximum total calorific value of the gas tap 100 is 3.5 Kw.

In this embodiment of the gas tap 100, and as shown in the graph of FIG. 10, the variable gas flow rate Qv in the outlet conduit 13 is equal to zero before the angular path A of the regulating element 20 ends. This situation in a gas tap from the prior art could give rise to an unburned gas flow when the angular position is close to the zero gas flow position. However, with the gas tap 100 of the invention, since there is a constant flow rate gas flow Qc at the nominal supply pressure Pn in the entire angular path A of the regulating element 20, the gas exiting the constant flow outlet hole 16 entrains the little amount of gas flow exiting the outlet holes 15, burning all the gas.

Figure 7:
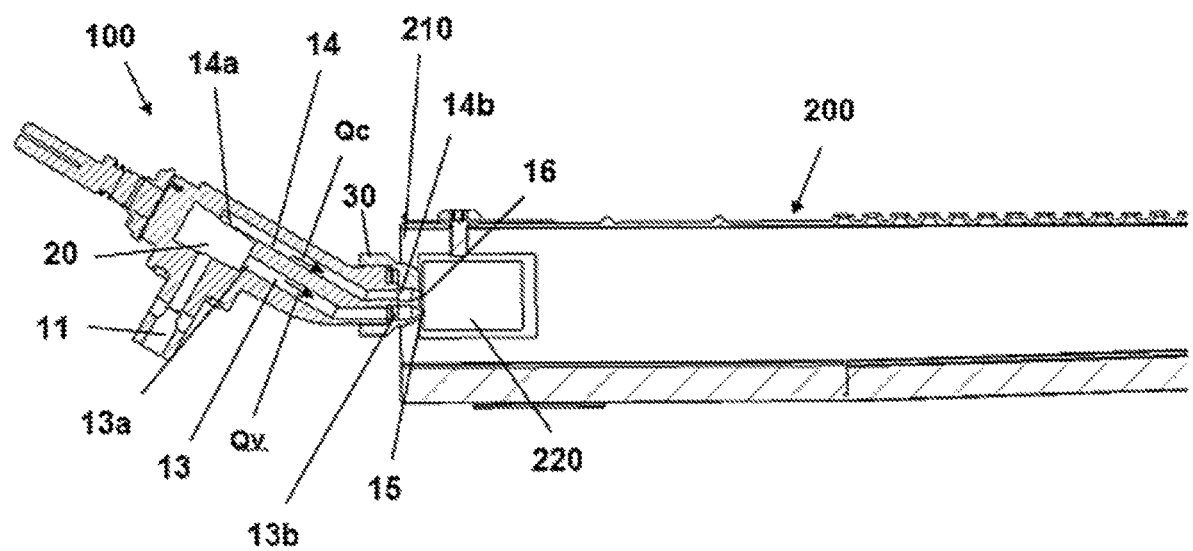
FIG. 7 shows a partial longitudinal section view of a second embodiment of the gas tap coupled to a gas burner.
Figure 8:
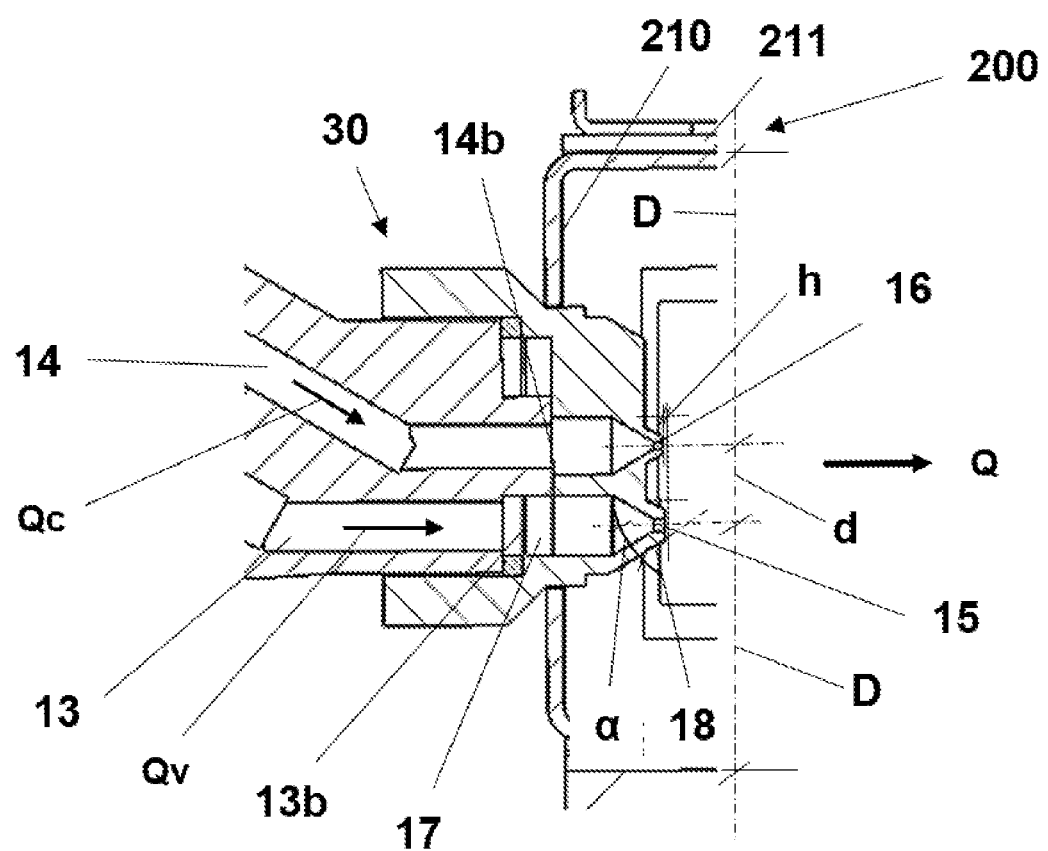
FIG. 8 shows a partial detailed longitudinal section view of the end of the gas tap coupled to a gas burner of FIG. 7.

FIGS. 7 and 8 show a partial longitudinal section view of a second embodiment of the gas tap 100 coupled to a gas burner 200 and a partial detailed longitudinal section view of the end of the gas tap 100 coupled to the gas burner 200 of FIG. 7. The gas burner 200 comprises the same features described above, and the second embodiment of the gas tap 100 differs from the first embodiment of the gas tap 100 shown in FIGS. 4 and 5 in that the injector 30 comprises a single outlet hole 15 instead of two. In this embodiment, the axes of the outlet holes 15 and 16 are arranged at the same distance d as the axes of the outlet holes 15 and 16 in the first embodiment of the gas tap 100, and the distance D between the axis of the outlet hole 15 and the closest wall 211 of the air absorption window 220 is the same, obtaining a similar air absorption ratio.

In that sense, in this second embodiment the injector 30 does not comprise the chamber 17, and the outlet conduit 13 is connected to the injector 30, the outlet conduit 13 and the outlet hole 15 being in direct fluid communication with one another. The rest of the features are the same, and the results of the obtained calorific value ratio in the gas burner 200 are similar to the first embodiment, and while the results of the flame quality in the outlet ports 240 of the gas burner 200 are somewhat lower than those of the first embodiment, they still far surpass those of the gas tap of the prior art, assuring the flame quality in all the outlet ports 240, and without requiring the use of a venturi in the gas burner 200.

In any of the embodiments of the gas tap 100, the injector 30 may comprise two attached bodies, a first body forming a base, and a second body having a smaller width than the first body. This second body comprises an inclined wall 18 surrounding and converging at the outlet holes 15 and 16, the inclined wall 18 and the axis of the outlet holes 15 and 16 forming an angle of inclination α of preferably 30°. With this, absorption of the primary air from the outside has fewer impediments against mixing with the gas injected from the outlet holes 15 and 16, and the proportion of primary air in the mixture increases at the outlet ports 240 of the gas burner 200.

According to some embodiments, the gas tap 100 of the invention which helps to improve the proportion of primary air at the outlet ports 240 of the gas burner 200 is the fact that the outlet of the outlet holes 15 is arranged on a plane that projects from the plane on which the outlet of the constant flow outlet hole 16 is arranged at height h. The entrainment effect the injected gas has on the absorbed air is enhanced.

In other embodiments of the gas tap 100, the diameter of the outlet hole 15 is larger than the diameter of the constant flow outlet hole 16, which collaborates in improving the mixture of air and gas at the outlet of the outlet holes 15 and 16, and thereby improving the outlet speed of the mixture of air and gas, and improving the proportion of air in said mixture at the outlet ports 240 of the gas burner 200.

The following clauses disclose in an unlimited way additional implementations.

Clause 1. A gas tap for a gas burner (200), comprising a valve body (10) comprising a gas inlet conduit (11) for the entry of gas at a nominal supply pressure (Pn), at least one gas outlet conduit (13) suitable for conducting gas to the burner (200) through an outlet hole (15), and a rotating regulating element (20) housed in said valve body (10) comprising a plurality of connection openings for regulating the incoming gas flow from the inlet conduit (11) to the outlet conduit (13), by varying an outlet gas flow rate (Q) at said outlet conduit (13) according to the angular position of the regulating element (20) on an angular path (A), the outlet conduit (13) conducting a variable flow rate gas flow (Qv) to the outlet hole (15) when the regulating element (20) rotates along the angular path (A), the gas tap further comprises a constant flow outlet conduit (14) for conducting a minimum constant flow rate gas flow (Qc) at the nominal supply pressure (Pn) to the burner (200) through a constant flow outlet hole (16) when the regulating element (20) rotates along the angular path (A).

Clause 2. A gas tap according to clause 1, wherein the variable gas flow rate (Qv) in the outlet conduit (13) ranges between zero and a maximum flow rate (Qmax) on the angular path (A) of the regulating element (20).

Clause 3. gas tap according to clause 2, wherein the variable gas flow rate (Qv) in the outlet conduit (13) is equal to zero before the angular path (A) of the regulating element (20) ends.

Clause 4. A gas tap according to any of the preceding clauses, wherein the constant flow outlet hole (16) defines a constant minimum gas outflow rate (Qcmin).

Clause 6. A gas tap according to any of the preceding clauses, wherein the diameter of the outlet hole (15) is larger than the diameter of the constant flow outlet hole (16).

Clause 7. A gas tap according to any of the preceding clauses, wherein the outlet of the outlet hole (15) is arranged on a plane that projects from the plane on which the outlet of the constant flow outlet hole (16) is arranged.

Clause 8. A gas tap according to any of the preceding clauses, comprising two outlet holes (15) and a constant flow outlet hole (16), with the constant flow outlet hole (16) being arranged between the two outlet holes (15).

Clause 9. A gas tap according to the preceding clause, wherein the outlet conduit (13) comprises a chamber (17), with the two outlet holes (15) being arranged in fluid communication with the chamber (17).

Clause 10. A gas tap according to any of the preceding clauses, wherein the outlet conduit (13) comprises an inclined wall (18) surrounding and converging at the outlet holes (15, 16), the inclined wall (18) and the axis of the outlet holes (15, 16) forming an angle of inclination (α) of preferably 30°.

Clause 11. A gas tap according to any of clauses 1 to 6, comprising an injector (30) arranged fixed to the outlet conduit (13), with the outlet holes (15, 16) being arranged in the injector (30).

Clause 12. A gas tap according to the preceding clause, comprising two outlet holes (15) and a constant flow outlet hole (16), with the constant flow outlet hole (16) being arranged between the two outlet holes (15), the injector (30) comprising a chamber (17), with the two outlet holes (15) being arranged in fluid communication with the chamber (17), and the injector (30) comprising an inclined wall (18) surrounding and converging at the outlet holes (15, 16), the inclined wall (18) and the axis of the outlet holes (15, 16) forming an angle of inclination (α) of preferably 30°.

Clause 13. A gas cooking appliance comprising at least one gas burner (200), and at least one gas tap (100) according to any of the preceding clauses.

Clause 14. A gas cooking appliance according to the preceding clause, wherein the gas burner (200) comprises an inlet mouth (210) and a side air absorption window (220) after the inlet mouth (210) in the gas flow direction, the gas outlet of the gas tap (100) being arranged in the inlet mouth (210) of the gas burner (200), the outlet holes (15, 16) being arranged before the air absorption window (220) in the gas flow direction, the gas outlet of the gas tap (100) preferably being centered in the inlet mouth (210) of the gas burner (200).

Clause 15. A cooking appliance according to clause 12 or 13, wherein the outlet holes (15, 16) are arranged horizontally aligned with respect to the gas burner (200).

Clause 16. A gas cooking appliance according to any of clauses 12 to 14, wherein the distance (d) from the axis of the constant flow outlet hole (16) to axis of the outlet hole (15) is less than the distance (D) between the axis of the outlet hole (15) and the closest wall (211) of the air absorption window (220) of the gas burner (200).

What is claimed is:

1. A gas tap for delivery a gas to a gas burner, the gas tap comprising:
   a valve body;
   a gas inlet conduit for the entry of gas at a nominal supply pressure into the valve body;
   a first gas outlet conduit;
   a second gas outlet conduit; and
   a rotating regulating element housed in the valve body and disposed in a gas flow path between the gas inlet conduit and each of the first and second gas outlet conduits, the rotating regulating element is rotatable along an angular path and is configured to provide the gas at a plurality of flow rates at a corresponding plurality of pressures to the first gas outlet conduit and to provide the gas at a constant flow rate at the nominal supply pressure to the second gas outlet conduit during a rotation of the rotating regulating element along the angular path.

2. The gas tap according to claim 1, wherein the first outlet conduit includes a first outlet hole configured to direct the gas into the gas burner and the second outlet conduit includes a second outlet hole configured to direct the gas into the gas burner.

3. The gas tap according to claim 1, wherein when the rotating regulating element is rotated along a full range of the angular path, the gas flow rate in the first outlet conduit ranges between a zero flow rate and a maximum flow rate.

4. The gas tap according to claim 3, wherein the rotating regulating element rotates along the angular path between an initial angular position and a final angular position, the rotating regulating element configured to cause the zero flow rate of gas in the first outlet conduit when the angular position of the rotating regulating element approaches the final angular position.

5. The gas tap according to claim 2, wherein the second outlet hole is configured to cause at an exit of the second outlet hole a constant minimum gas flow rate.

6. The gas tap according to claim 2, wherein the first outlet hole has a first diameter and the second outlet hole has a second diameter, the first diameter being greater than the second diameter.

7. The gas tap according claim 2, wherein an exit of the first outlet hole is arranged on a first plane and an exit of the second outlet hole is arranged on a second plane, the second plane being located downstream the first plane in the gas flow direction.

8. The gas tap according to claim 2, wherein an exit of the second outlet hole is located downstream an exit of the first outlet hole.

9. The gas tap according to claim 2, further comprising an injector integrally formed as a single piece with the valve body or formed as a separate piece and coupled to the valve body, the first and second outlet holes being located inside the injector.

10. The gas tap according to claim 2, wherein the first outlet conduit includes the first outlet hole and a third outlet hole, the second outlet hole being arranged between the first and third outlet holes.

11. The gas tap according to claim 10, wherein the second outlet hole is located a first distance from the first outlet hole and a second distance away from the third outlet hole, the first and second distances being the same.

12. The gas tap according to claim 10, wherein the first outlet conduit comprises a chamber in fluid communication with the first and third outlet holes.

13. The gas tap according to claim 9, wherein the first outlet conduit comprises an inclined wall surrounding and converging toward the first outlet hole, the inclined wall and an axis of the first outlet hole forming an angle of inclination of 30°.

14. A gas cooking appliance comprising:
a gas burner comprising:
an inlet mouth,
a side air absorption window located downstream the inlet mouth in the gas flow direction; and
a gas tap for delivery a gas to the gas burner, the gas tap comprising:
a valve body,
a gas inlet conduit for the entry of gas at a nominal supply pressure into the valve body,
a first gas outlet conduit having a first outlet hole located in the inlet mouth of the gas burner,
a second gas outlet conduit having a second outlet hole located in the inlet mouth of the gas burner, and
a rotating regulating element housed in the valve body and disposed in a gas flow path between the gas inlet conduit and each of the first and second gas outlet conduits, the rotating regulating element is rotatable along an angular path and is configured to provide the gas at a plurality of flow rates at a corresponding plurality of pressures to the first gas outlet conduit and to provide the gas at a constant flow rate at the nominal supply pressure to the second gas outlet conduit during a rotation of the rotating regulating element along the angular path.

15. The gas cooking appliance according to claim 14, wherein each of the first and second outlet holes of the respective first and second outlet conduits is located upstream the air absorption window in the gas flow direction.

16. The gas cooking appliance according to claim 15, wherein the first and second outlet holes are located in a gas outlet of the gas tap, the gas outlet of the gas tap being centered in the inlet mouth of the gas burner.

17. The gas cooking appliance according to claim 14, wherein the first outlet hole includes a first central axis and the second outlet hole has a second central axis, the first central axis and the second central axis being spaced apart by a first distance, the air absorption window being defined in part by an inner wall having a wall portion located nearest the first central axis, the wall portion and first central axis being spaced apart by a second distance that is greater than the first distance.

18. The gas cooking appliance according to claim 14, further comprising a injector integrally formed as a single piece with the valve body or formed as a separate piece and coupled to the valve body, the first and second outlet holes being located inside the injector.

19. The gas cooking appliance according to claim 14, wherein when the rotating regulating element is rotated along a full range of the angular path, the gas flow rate in the first outlet conduit ranges between a zero flow rate and a maximum flow rate.

20. The gas cooking appliance according to claim 19, wherein the rotating regulating element rotates along the angular path between an initial angular position and a final angular position, the rotating regulating element configured to cause the zero flow rate of gas in the first outlet conduit when the angular position of the rotating regulating element approaches the final angular position.

* * * * *